US009986463B2

(12) United States Patent
Sun et al.

(10) Patent No.: US 9,986,463 B2
(45) Date of Patent: *May 29, 2018

(54) INTER-APN ROUTING FLOW DISTRIBUTION

(71) Applicant: LG ELECTRONICS INC., Seoul (KR)

(72) Inventors: Li-Hsiang Sun, San Diego, CA (US); Saso Stojanovski, Paris (FR)

(73) Assignee: LG ELECTRONICS INC., Seoul (KR)

(*) Notice: Subject to any disclaimer, the term of this patent is extended or adjusted under 35 U.S.C. 154(b) by 130 days.

This patent is subject to a terminal disclaimer.

(21) Appl. No.: 15/067,547

(22) Filed: Mar. 11, 2016

(65) Prior Publication Data
US 2016/0198366 A1 Jul. 7, 2016

Related U.S. Application Data

(63) Continuation of application No. 14/237,307, filed as application No. PCT/KR2012/006166 on Aug. 2, 2012, now Pat. No. 9,319,938.
(Continued)

(51) Int. Cl.
*H04W 28/12* (2009.01)
*H04L 12/721* (2013.01)
(Continued)

(52) U.S. Cl.
CPC ............ *H04W 28/12* (2013.01); *H04L 45/38* (2013.01); *H04W 28/10* (2013.01); *H04W 36/22* (2013.01);
(Continued)

(58) Field of Classification Search
CPC ..... H04W 28/12; H04W 28/10; H04W 36/22; H04W 76/022; H04W 76/025; H04L 45/38; H04L 45/04
(Continued)

(56) References Cited

U.S. PATENT DOCUMENTS

2010/0272013 A1   10/2010   Horn et al.
2011/0103266 A1   5/2011   Andreasen et al.
(Continued)

FOREIGN PATENT DOCUMENTS

CN   101268668   9/2008
CN   101981976   2/2011

OTHER PUBLICATIONS

Korean Intellectual Property Office Application No. 10-2014-7005951, Notice of Allowance dated Mar. 25, 2016, 5 pages.
(Continued)

*Primary Examiner* — Obaidul Huq
(74) *Attorney, Agent, or Firm* — Lee Hong Degerman Kang Waimey

(57) ABSTRACT

For Inter-APN routing flow distribution, a step of receiving, by a UE from a server, an Inter-System Routing Policy (ISRP) rule that comprises flow distribution rules for at least one of a For Flow Based flow distribution container used for IP Flow Mobility (IFOM), a For Service Based flow distribution container used for Multi-Access PDN Connectivity (MAPCON), a For Non-Seamless Offload flow distribution container used for Non-Seamless WLAN Offload (NSWO), and an Inter-APN routing flow distribution container, is performed. Here, the Inter-APN routing flow distribution container comprises information related to routing IP flows with respect to a plurality of APNs for using PDN connections to access multiple IP networks. Then a step of selecting, by the UE, among active/valid flow distribution rules in
(Continued)

the received ISRP rule, a flow distribution rule having highest priority is performed.

6 Claims, 12 Drawing Sheets

Related U.S. Application Data

(60) Provisional application No. 61/515,763, filed on Aug. 5, 2011.

(51) Int. Cl.
    *H04W 28/10*     (2009.01)
    *H04W 36/22*     (2009.01)
    *H04W 76/02*     (2009.01)
    *H04L 12/715*     (2013.01)

(52) U.S. Cl.
    CPC ........... *H04L 45/04* (2013.01); *H04W 76/022* (2013.01); *H04W 76/025* (2013.01)

(58) Field of Classification Search
    USPC .................................................. 370/229, 235
    See application file for complete search history.

(56) References Cited

U.S. PATENT DOCUMENTS

2011/0153792 A1     6/2011     Bachmann et al.
2013/0012182 A1     1/2013     Liao et al.

OTHER PUBLICATIONS

Qualcomm Incorporated, "Usage of ISRP and conflicts resolution", C1-110968, 3GPP TSG-CT WG1 Meeting #70, Feb. 2011, 8 pages.
LG Electronics, "OPIIS solution based on addition of new Filter Rules for Inter-APN Routing in existing ISRPs", SA WG2 Meeting #91, S2-122425 (revision of S2-122034), XP050632954, May 25, 2012, 3 pages.
Motorola Mobility et al., "ISRP policies for Inter-APN Routing", 3GPP TSG SA WG2 Meeting #83, S2-111033 (Revision of S2-110587), XP050524019, Feb. 24, 2011, 5 pages.
European Patent Office Application No. 12822439.1, Office Action dated May 24, 2016, 7 pages.
The State Intellectual Property Office of the People's Republic of China Application Serial No. 201280049224.0, Office Action dated Nov. 21, 2016, 10 pages.
LG Electronics, et al., "Enhancing Inter-System Routing Policies to include routing of IP flows across multiple APNs", S2-105493, 3GPP TSG SA WG2 Meeting #82, Nov. 2010, 14 pages.
LG Electronics, "Clarification on Inter-System Routing Policies—Alignment with Stage 3", S2-110180, 3GPP TSG SA WG2 Meeting #82, Jan. 2011, 5 pages.
The State Intellectual Property Office of the People's Republic of China Application Serial No. 201280049462.1, Office Action dated Dec. 5, 2016, 5 pages.
Qualcomm Inc., "Usage of ISRP and conflicts resolution," 3GPP TSG-CT WG1 Meeting #70, C1-111171, XP050587142, Feb. 2011, 13 pages.
3rd Generation Partnership Project (3GPP), "Technical Specification Group Core Network and Terminals; Access Network Discovery and Selection Function (ANDSF) Management Object (MO) (Release 10)," 3GPP TS 24.312 V10.3.0, XP050553064, Jun. 2011, 155 pages.
Motorola Mobility, "Solution with Inter-APN Routing Policies," 3GPP TSG SA WG2 Meeting #84, TD S2-111733, XP050524634, Apr. 2011, 4 pages.
Nokia Siemens Networks, et al., "Correction of Inter System Routing Policy (ISRP) MO structure," 3GPP TSG CT WG1 Meeting #69, C1-110053, XP002640299, Jan. 2011, 6 pages.
Qualcomm Inc., Editor's notes in 24.302, 3GPP TSG-CT WG1 Meeting #70, C1-110965, XP050587115, Feb. 2011, 3 pages.
European Patent Office Application Serial No. 12822439.1, Search Report dated Mar. 20, 2015, 8 pages.

INTER-APN ROUTING FLOW DISTRIBUTION

CROSS-REFERENCE TO RELATED APPLICATIONS

This application is a continuation of U.S. application Ser. No. 14/237,307, filed on Feb. 5, 2014, now U.S. Pat. No. 9,319,938, which is the National Stage filing under 35 U.S.C. 371 of International Application No. PCT/KR2012/006166, filed on Aug. 2, 2012, which claims the benefit of U.S. Provisional Application No. 61/515,763, filed on Aug. 5, 2011, the contents of which are all hereby incorporated by reference herein in their entirety.

TECHNICAL FIELD

The following description is related to wireless communications. In the background art, the so-called Inter-APN routing flow distribution could not be fully and properly supported in certain types of wireless communication systems.

DISCLOSURE

Technical Solution

Regarding the Inter-APN relationship with Inter-System Routing Policy (ISRP), the present inventors conceived a method comprising: receiving, by a UE from a server, an ISRP rule that comprises flow distribution rules for at least one of a For Flow Based flow distribution container used for IP Flow Mobility (IFOM), a For Service Based flow distribution container used for Multi-Access PDN Connectivity (MAPCON), a For Non-Seamless Offload flow distribution container used for Non-Seamless WLAN Offload (NSWO), and an Inter-APN routing flow distribution container, wherein the Inter-APN routing flow distribution container comprises information related to routing IP flows with respect to a plurality of APNs for using PDN connections to access multiple IP networks; and selecting, by the UE, among "active/valid" flow distribution rules in the received ISRP rule, a flow distribution rule having highest priority.

MODE FOR INVENTION

Figure 1:
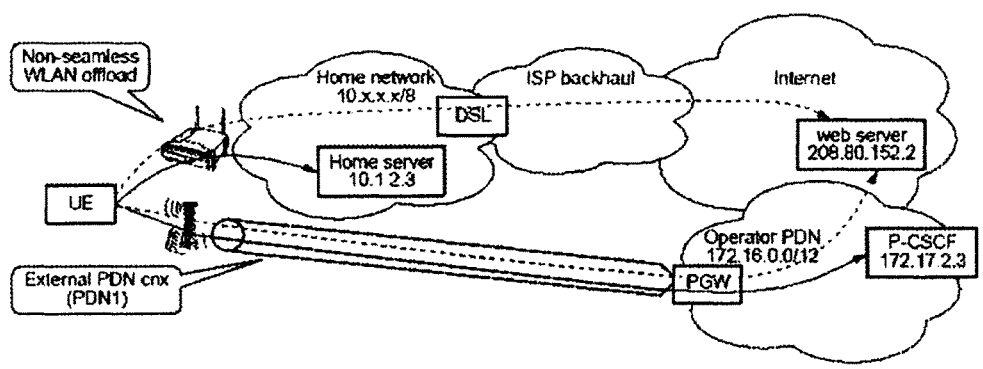
FIG. 1 is an example scenario of non-seamless WLAN offload.

In 3GPP cellular systems, a cellular terminal (or user equipment (UE)) can access several IP networks in parallel by establishing a so-called Packet Data Network (PDN) connection (also referred to as Primary PDP Context in pre-Rel-8 3GPP specifications) to each of the PDNs it wishes to access. A typical use case is the following. The UE may need to access the Internet in parallel to the operator's IP Multimedia Subsystem (IMS) and in parallel to the user's corporate intranet. On every PDN connection the UE is assigned a distinct IP address. In Internet Engineering Task Force (IETF) parlance, the UE is an IP host with multiple IP interfaces, also referred to as 'multi-homed host'.

In some cases it is possible to reach the same set of destination IP addresses (e.g., the public Internet addresses) via more than one PDN. In such scenarios, it is desirable to select the most appropriate PDN, e.g., the one incurring the lowest transport cost.

The IETF has recently started working on a similar problem, namely the problem of hosts having multiple network interfaces (e.g., physical interfaces, virtual interfaces, or combinations thereof). The IETF has created a working group called MIF (for Multiple InterFaces) whose charter is available on the Internet. However, this working group has not yet come up with much output beyond the problem description and a list of current practices in terminal implementations. The current practices rely on a number of suboptimal mechanisms such as: static configuration (e.g., defining one interface as a primary interface for all traffic, which is typically the case for computers equipped with Windows operating systems up to Vista), or load sharing between the multiple interfaces (for traffic that can be sent on either interface), or trial-and-error mechanisms, etc. All these approaches are suboptimal as they do not take into account the specifics of the underlying IP networks (e.g. transport cost).

On the 3GPP side, the problem of multi-homed UEs has been touched upon as part of the Release-10 work item on 'non-seamless WLAN offload (NSWO)' (see in particular 3GPP SP-090616 'WID on IP Flow Mobility and seamless WLAN offload' and 3GPP TS 23.861 'Feasibility study on MAPIM'). The offload is qualified as non-seamless because traffic is offloaded on a care-of address, which means that the session is broken if the radio access is changed (the address needs to change). The objective is to allow dual-mode dual radio terminals (i.e. UEs having a cellular and a WLAN interface) to use the WLAN access to connect to the Internet directly, without traversing the 3GPP operator's core network. As of September, 2010, it was agreed that this can be achieved by provisioning operator's policies via extensions to the ANDSF (Access Network Discovery and Selection Function) framework (S2-104336) that was specified in 3GPP TS 23.402 ("Architecture enhancements for non-3GPP accesses; Stage 2").

However, with non-seamless offload, when IP flows are sent to the WLAN, they are not associated with any specific access point name (APN). In other words, non-seamless offload operates on an IP flow basis, but does not choose an APN corresponding to the IP flow; instead it chooses a radio interface (e.g. WLAN). There is no PDN connection (which would be linked to a PGW and associated with an APN). It should be noted that the APN is the name of an access point previously defined within a network to find a PGW when a requested service is passed through the PGW to access a network. The APN is provided to the UE, and the UE determines a suitable PGW for data transmission and reception based on the APN. The PGW (PDN gateway) is an entity configured to perform IP address allocation for the UE, as well as QoS enforcement and flow-based charging.

FIG. 1 is an example scenario of non-seamless WLAN offload. A Rel-10 UE capable of non-seamless WLAN offload can do the following:
- use the cellular access (macro or femto) for access to either operator's services or the Internet; and
- use the WLAN interface for non-seamless WLAN offload and access to either local resources or the Internet.

In this example the UE has one PDN connection via cellular access (PDN1) to the Operator's PDN. It is depicted as a grayed tunnel between the UE and the Packet Data Gateway (PGW), a node representing the ingress point to PDN1, which also assigns the IP address used by the UE on this PDN.

In order to be able to use the non-seamless WLAN offload feature, the UE needs to be dual mode (3GPP+WLAN) and dual radio. In the example in FIG. 1, the UE uses the WLAN access to directly access the Home network. Note that the Home network assigns another IP address to the UE it is used in all IP packets that UE sends or receives via the Home network.

Some destinations are reachable only via PDN1 or via the direct WLAN access. For instance, the P-CSCF node (which is the ingress point to the operator's IP multimedia subsystem) is reachable only via PDN1, whereas the Home server is reachable only via the direct WLAN access. On the other hand, hosts residing in the Internet can be reached via either access.

Performing non-seamless WLAN offload in this example means routing Internet-bound traffic via the direct WLAN access whenever the UE is in WLAN coverage, because the cost of using WLAN is much lower compared to the cost of using the cellular access.

As the UE moves out of WLAN coverage, the Internet-bound traffic can be re-routed via PDN1.

Non-seamless WLAN offload was defined in 3GPP Rel-10. Routing policies described in the previous paragraphs are provided to the UE via extensions to the ANDSF (Access Network Discovery and Selection Function) architecture specified in 3GPP TS 23.402.

Since the Internet can be reached through both, ANDSF policies should steer Internet traffic towards WLAN, whenever available, and when non-seamless WLAN offload is used to access the Internet, the overall effect is similar to SIPTO from a femto cell (femto-SIPTO).

Figure 2:
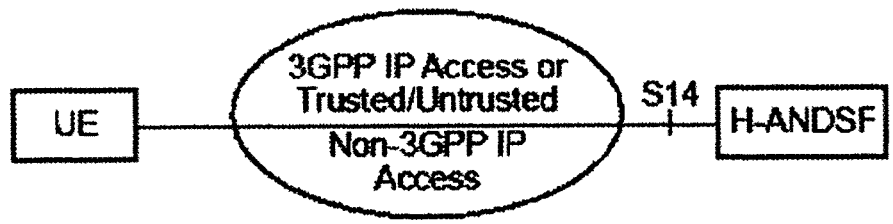
FIG. 2 illustrates roaming ANDSF architectures.
Figure 3:
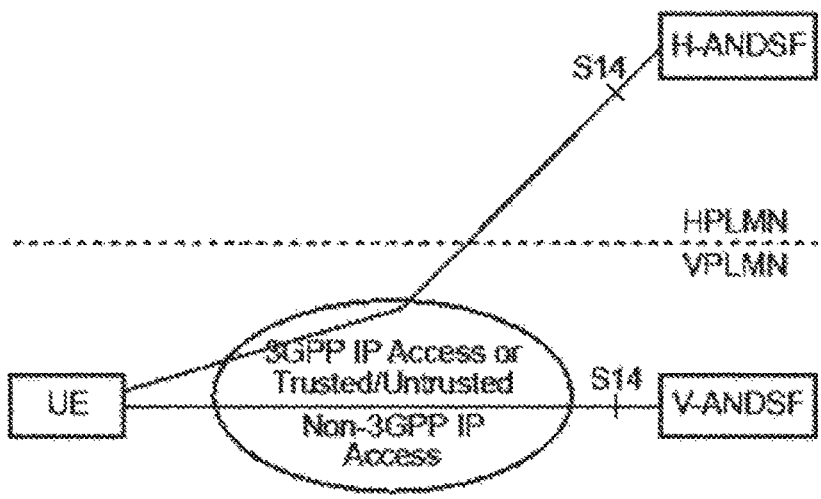
FIG. 3 illustrates roaming ANDSF architectures.

FIG. 2 and FIG. 3 are the non-roaming and roaming ANDSF architectures (respectively), as defined in 3GPP TS 23.402.

The ANDSF can be accessed via either 3GPP or non-3GPP access, however, the provided information is used only in relation with a non-3GPP access.

The ANDSF architecture (optional) may be used to:
- provide access network discovery information to the terminal e.g. a list of available WLAN or WiMAX hotspots corresponding to the current UE location,
- provide Inter-System Mobility Policies (ISMPs) that steer the terminal to the preferred network access.

In Rel-10, the ANDSF was enhanced to provide Inter-System Routing Policies (ISRPs); among other things they are used to steer IP flows towards WLAN access for Non-seamless WLAN offload.

While ISMPs includes network selection rules for a UE with no more than one active access, ISRP includes network selection rules for a UE potentially more than one active access network connection (e.g., both LTE and WLAN). UE with ISRP may employ IP follow mobility (IFOM), multiple-access PDN connectivity (MAPCON), and/or non-seamless WLAN offload (NSWO) according to operator policy and user preferences. IFOM, MAPCON are explained below.

In Rel-11, it was agreed to extend the scope of IP interface selection to also include scenarios with multiple PDN connections regardless of whether they are established on the same or different radio accesses. The resulting work item is called OPIIS (Operator Policies for IP Interface Selection) and the study is carried out in 3GPP TR 23.853. The working assumption is to re-use the ANDSF for distribution of routing policies.

As discussed above, two other techniques (MAPCON and IFOM) are also available to assist the UE in routing of IP packets based on ANDSF policies.

Figure 4:
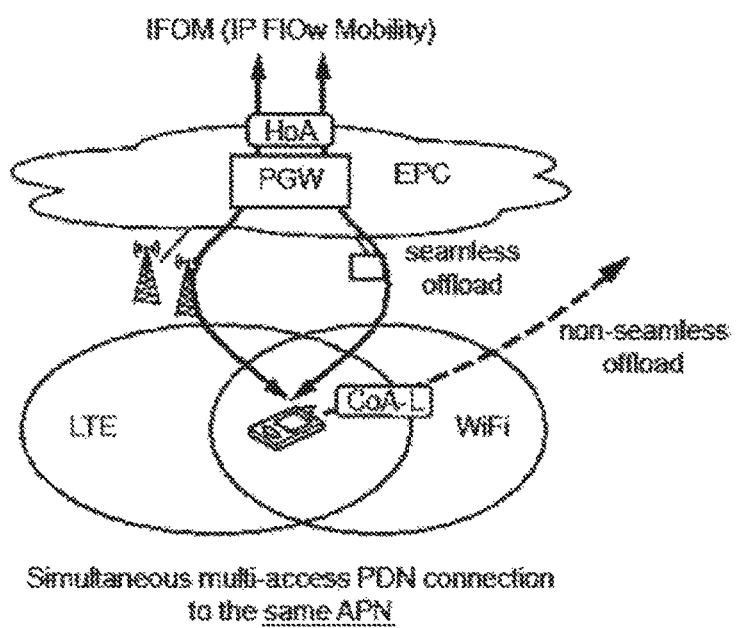
FIG. 4 represents an overview of IFOM architectures.

FIG. 4 represents an overview of IFOM architectures. IFOM stands for IP Flow Mobility and is specified in TS 23.261. IFOM allows for individual IP flows to be routed over WLAN or over 3GPP access defined for DSMIPv6 only (currently there is no solution with network based mobility). The UE is a dual radio UE; WLAN and 3GPP interface run continuously in parallel. For instance, IFOM can be applicable to text data and video data associated with the same service. Different IP port numbers can be allocated with the text and video services respectively, and one IP flow for the text service can be routed over 3GPP access whereas the other IP flow for the video service can be routed over WLAN.

IFOM is also known as "seamless WLAN offload," because flows can be re-routed from one access to another with no service break. From an implementation perspective this is only a DSMIPv6 enhancement. IFOM enables simultaneous multi-access PDN connection to the same APN. So IFOM offers IP flow granularity, but only on a single APN.

Figure 5:
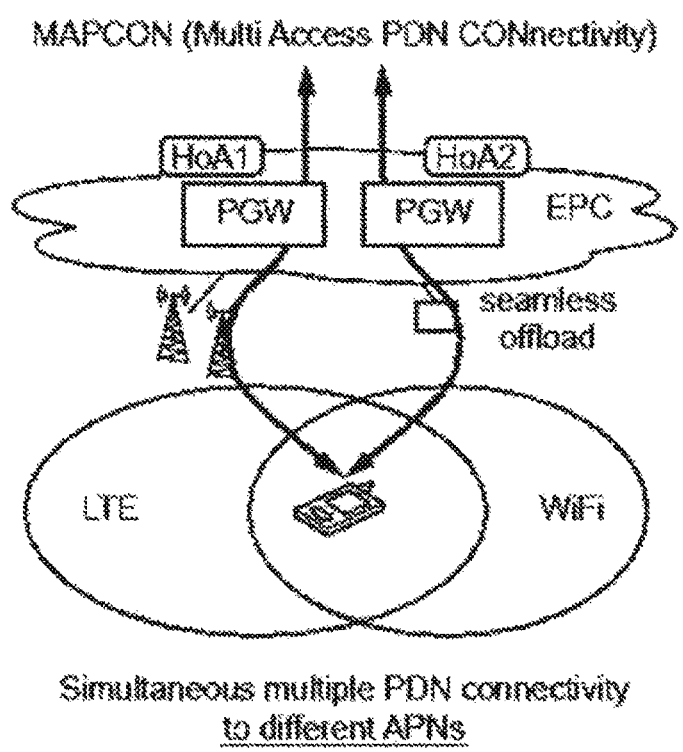
FIG. 5 represents an overview of MAPCON architectures.

FIG. 5 represents an overview of MAPCON architectures. MAPCON stands for Multi Access PDN CONnectivity. MAPCON allows for entire PDN connections to be routed over WLAN or over 3GPP access. In other words, the granularity of MAPCON is only on a per PDN connection basis, not on a per IP flow basis. MAPCON works with both DSMIPv6 and network based mobility. The UE is a dual radio UE; WLAN and 3GPP interface run continuously in parallel. MAPCON enables simultaneous multiple PDN connectivity to different APNs.

In the meantime, the ANDSF may be used for provision of Inter-APN Routing Policies (IARPs) to Ues that are capable of routing IP flows across multiple PDN connections, regardless of whether the UE supports non-3GPP access or not.

The Inter-APN Routing Policies (IARP) can be statically configured in the UE or they could be provisioned by the ANDSF. A UE that is inter-APN capable can use IARP to select an outgoing interface based on one preferred APN (e.g., one APN with the highest priority) in IARP policies. A UE is defined to be inter-APN capable if it is capable of routing IP flows across multiple simultaneously active interfaces, each one associated with a different APN. These interfaces may be linked to different access networks or linked with the same access network.

The UE may use the IARPs when it can route IP flows over multiple PDN connections in order to meet the operator routing/offload preferences by:

deciding when an APN is restricted for a specific IP flow; and selecting the most preferable APN which shall be used by the UE, when a PDN connection to that APN is available, to route IP flows that match specific IP filters.

The IARPs may be provisioned in the UE and may be updated by the ANDSF based on network triggers or after receiving a UE request.

It should be noted that features of 'inter-APN' are understood based on 'APN' whereas features of 'non-seamless WLAN offload (NSWO)' are based on WLAN which are not associated with a specific APN. Therefore, in a 'mixed' case/scenario where features of 'inter-APN' and 'NSWO' are used together, the concept of 'interface' which covers both APN and WLAN is commonly used.

This description describes solutions that define operator policies for selecting an IP interface in the UE for routing of IP flows among a choice of available interfaces in both 3GPP and non-3GPP accesses, and system architecture for distribution of these policies to the UE. Here, although the present description is applicable to Release 10 (Rel-10) ANDSF architecture or its evolved architecture, the working assumption is that the Release 10 (Rel-10) ANDSF architecture is used for distribution of the operator policies defined herein.

For clarity of explanation, the solutions described herein shall clarify how the defined operator policies relate with the Rel-10 ANDSF policies. The analysis of the architectural aspects to achieve such objectives will result in selection of a solution and inclusion of such in the relevant technical specifications.

For the purposes of the present description, the terms, definitions and abbreviations given in certain technical documents (e.g. 3GPP TR21.905) and the following apply.

This description is related to a number of scenarios associated with multiple PDN connections in presence of non-seamless WLAN offload. Hereinafter, a number of scenarios related to multiple PDN connections and/or non-seamless WLAN offload (NSWO) are explained.

Figure 6:
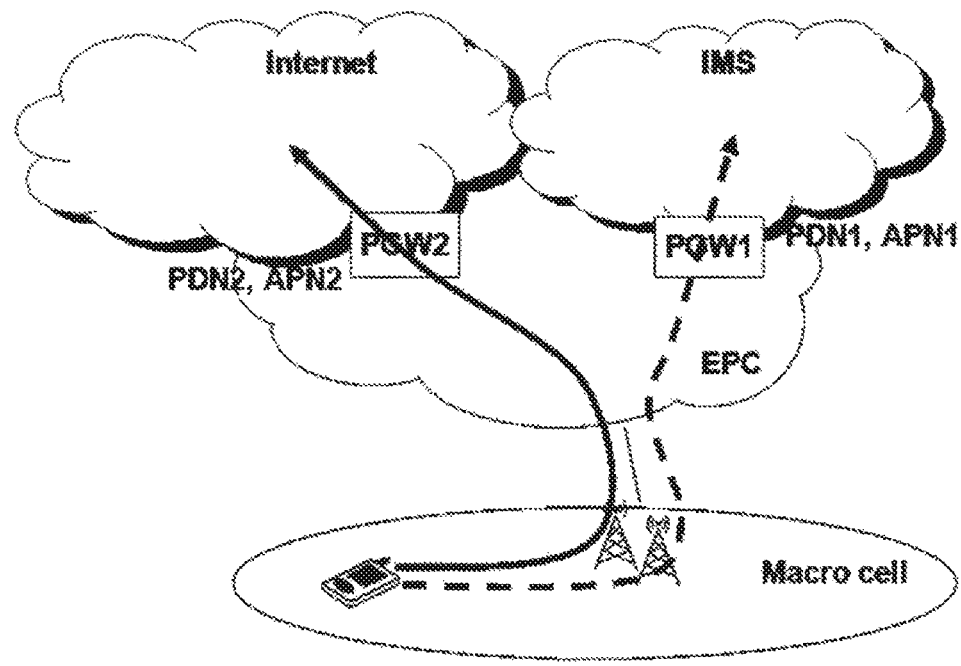
FIG. 6 depicts a first scenario with multiple PDN connections, in which the user has two established PDN connections.

FIG. 6 depicts a first scenario with multiple PDN connections, in which the user has two established PDN connections: a connection PDN1 associated with APN1, used for access to the IMS core network; and a connection PDN2 associated with APN2, used for access to the Internet.

For traffic flows generated by applications that are not bound to an APN, the UE relies on operator policies defined in this TR to decide on which PDN connection to route the IP flows.

Figure 7:
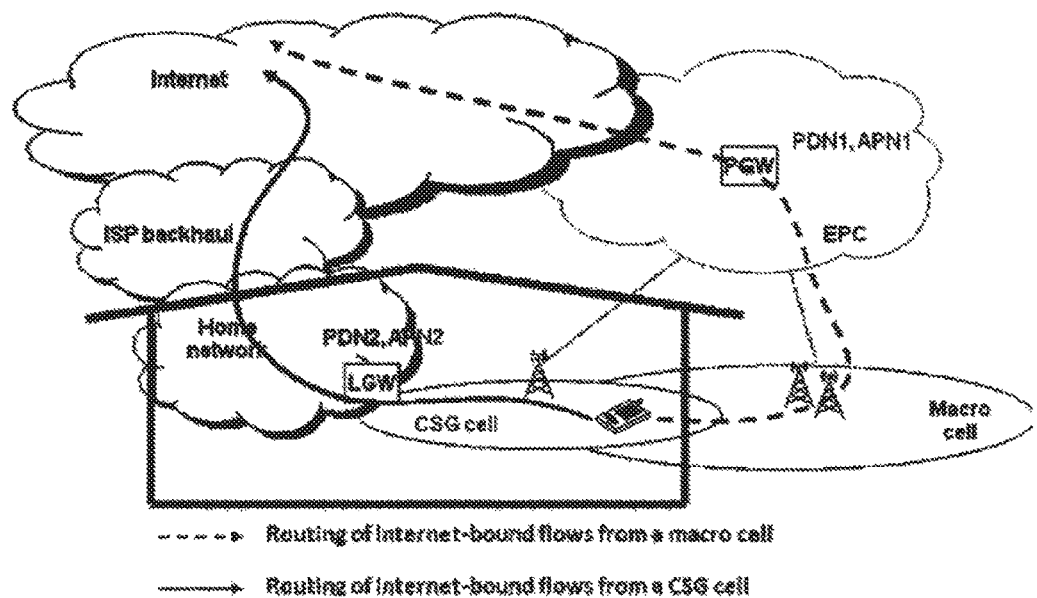
FIG. 7 depicts a second scenario, in which there are multiple PDN connections from a CSG cell.

FIG. 7 depicts a second scenario, in which there are multiple PDN connections from a closed subscriber group (CSG) cell (or a CSG femto cell). The CSG indicates subscribers of an operator who are permitted to access one or more cells of the PLMN (Public Land Mobile Network) but which have restricted access. A base station (BS) capable of providing CSG services can be referred to as the HeNB, and a cell serving CSG members can be referred to as a CSG cell.

This scenario begins with the user outside of his home with an established PDN connection (PDN1) that is used for all traffic flows (e.g. IMS, Internet, etc). The PDN connection PDN1 is associated with APN1. When the user returns home, a second PDN connection (PDN2) is established with a local gateway (LGW), which is a gateway for enabling the local IP access (LIPA) connection (LIPA) through the HeNB. The LIPA provides access from a communication device to a home-based network (for any kind of IP based services, not only for voice) through the femto cell or the HeNB. The PDN connection PDN2 is associated with APN2.

From this point on, some Internet-bound flows can be routed via PDN2, pending user's consent. The UE relies on operator policies defined in this TR for identifying the candidate Internet-bound flows that can be routed via PDN2.

It should be noted that based on UE implementation, the UE may decide to re-route any active IP flows (i.e. flows that were established while the user was outside the home) via PDN2, in which case IP address preservation is not provided.

When the user leaves the home again, the PDN2 connection is released. The UE relies on operator policies defined in this TR for identifying the candidate Internet-bound flows that can be routed via PDN1 again.

Figure 8:
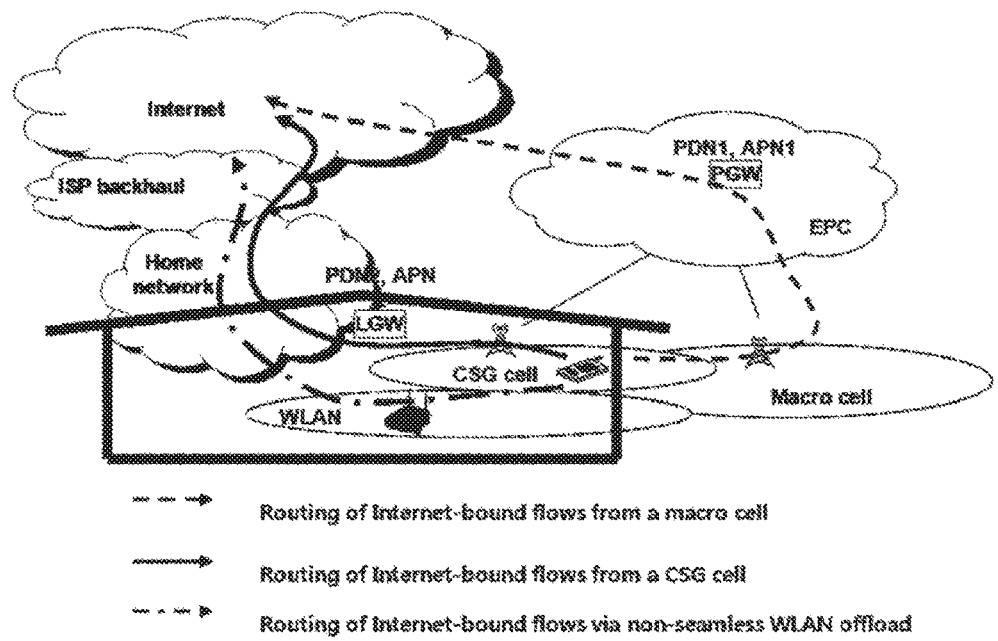
FIG. 8 depicts a third scenario related to Multiple PDN connections and non-seamless WLAN offload.

FIG. 8 depicts a third scenario related to Multiple PDN connections and non-seamless WLAN offload. This scenario begins with the user outside of his home with an established PDN connection (PDN1) that is used for all traffic (e.g. IMS, Internet, etc). The PDN connection PDN1 is associated with APN1.

When the user returns home, a second PDN connection (PDN2) is established with a local gateway (LGW). The PDN connection PDN2 is associated with APN2. In addition, the UE's capability for non-seamless WLAN offload (NSWO) is enabled.

From this point on, some Internet-bound flows can be routed either via PDN2 (pending user's consent) or via non-seamless WLAN offload. The UE relies on operator policies for identifying the candidate Internet-bound flows that can be routed via PDN2 or via non-seamless WLAN offload.

It should be noted that based on implementation, the UE may decide to re-route any active IP flows (i.e. flows that were established while the user was outside the home) via PDN2 or via non-seamless WLAN offload, in which case IP address preservation is not provided.

When the user leaves the home again, the PDN2 connection is released and the WLAN coverage is not available. The UE relies on operator policies defined in this TR for identifying the candidate Internet-bound flows that can be routed via PDN1 again.

The present description provides a number of routing policies capable of steering the inter-APN capable UE to route Internet traffic accordingly. In an example depicted in FIG. 8, conventional routing rules have failed to steer the UE accordingly. In particular, it should be noted that conventional art have two distinct technical problems, i.e., the first problem of failing to steer the UE accordingly in a mixed scenario of inter-APN and NWSO and the second problem of failing to steer the UE accordingly in a scenario where a certain APN is IFOM (or MAPCON) enabled.

The first problem of conventional art can be understood in view of FIG. 8. In particular, in a 'mixed' scenario with NSWO, when the user is at home, there can be three possibilities for routing of Internet traffic: APN1, APN2 and NSWO. The UE based on conventional art merely selects a preferred interface based either on priorities of inter-APN interfaces or on priorities of WLAN interfaces. Therefore, conventional art fails to provide a proper routing mechanism in a case where a number of APNs and NSWO are co-existed. On the other hand, the present description proposes routing policies able to steer the UE towards the aforementioned three interfaces in any priority order; in particular the following two priority orders, i.e., Interface Priority Order #1 (NSWO (highest), APN2, APN1 (lowest)), and Interface Priority Order #2 (APN2 (highest), NSWO, APN1 (lowest)).

Figure 9:
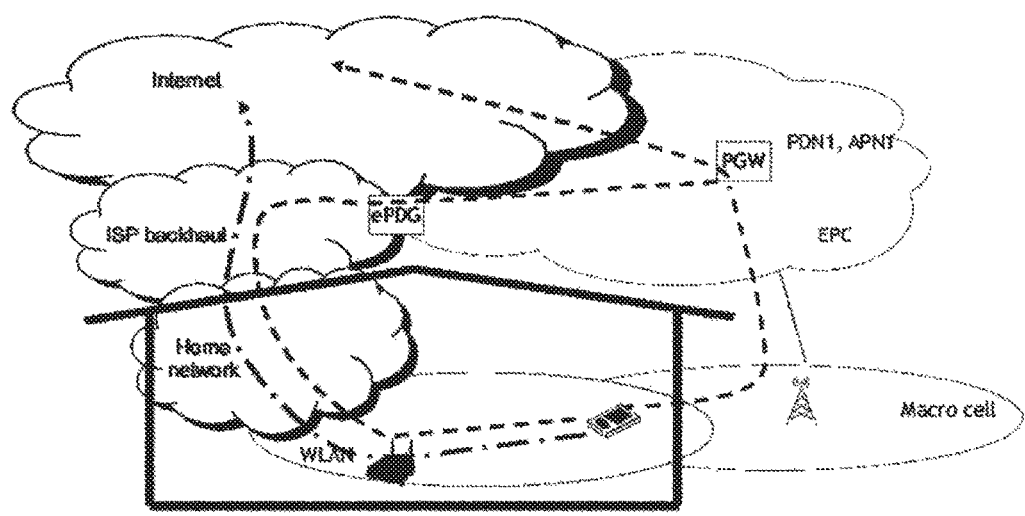
FIG. 9 depicts another scenario, in which there is one PDN connection that is IFOM enabled.

The second problem of conventional art can be understood in view of FIG. 9. FIG. 9 depicts another scenario, in which there is one PDN connection that is IFOM enabled. In particular, there is a possible scenario, in which there is one PDN connection (or APN) that is IFOM enabled and a possibility for performing NSWO in parallel. In conventional art, once a certain rule policy is successfully parsed by the UE, the UE merely selects one interface (e.g., a specific APN) and discards the parsed rule. However, it should be noted that if such APN is IFOM or MAPCON enabled, an additional round of evaluation (or additional iteration) is preferably required. The present description proposes routing policies able to steer the UE towards interfaces depicted in FIG. 9 based on the Interface Priority Order #3 (APN1 highest, NSWO lowest), in a case where it is assumed that one PDN connection (i.e., PDN1 and APN1) is IFOM- or MAPCON-enabled and WLAN access is higher priority than 3GPP access within APN1.

Hereafter, some architectural requirements based on the scenarios described above are considered for the present description:

The solution for IP interface selection should minimize the conflict with the Inter-System Routing Policies (ISRPs) specified in Rel-10.

The solution shall allow the UE to override the rules for OPIIS for traffic that is explicitly bound to a local IP address of the UE and/or an APN, or due to user preferences.

For UEs capable of operating multiple PDN connections simultaneously the EPS shall allow the operator to provide policies that assist the UE in selecting a specific APN for routing a specific IP flow. The operator policies may also indicate which APNs are restricted for a specific IP flow.

For UEs capable of operating multiple PDN connections simultaneously and also capable of non-seamless WLAN offload (NSWO), the EPS shall allow the operator to provide policies that assist the UE in deciding whether a specific IP flow should be routed on a specific APN. The operator policies may also indicate which APNs are restricted for a specific IP flow.

The present inventors have conceived a solution for Inter-APN Routing Policies. To support policy-based IP interface selection based on the scenarios described above, a new set of routing policies is introduced called Inter-APN Routing Policies (IARP) is provided.

The present description focuses on enhancing a multiple interface related routing policy rule which covers IFOM, MAPCON, and Non-seamless WLAN offload (NSWO) features. In one design, the multiple interface related routing policy rule is the ISRP.

Figure 10:
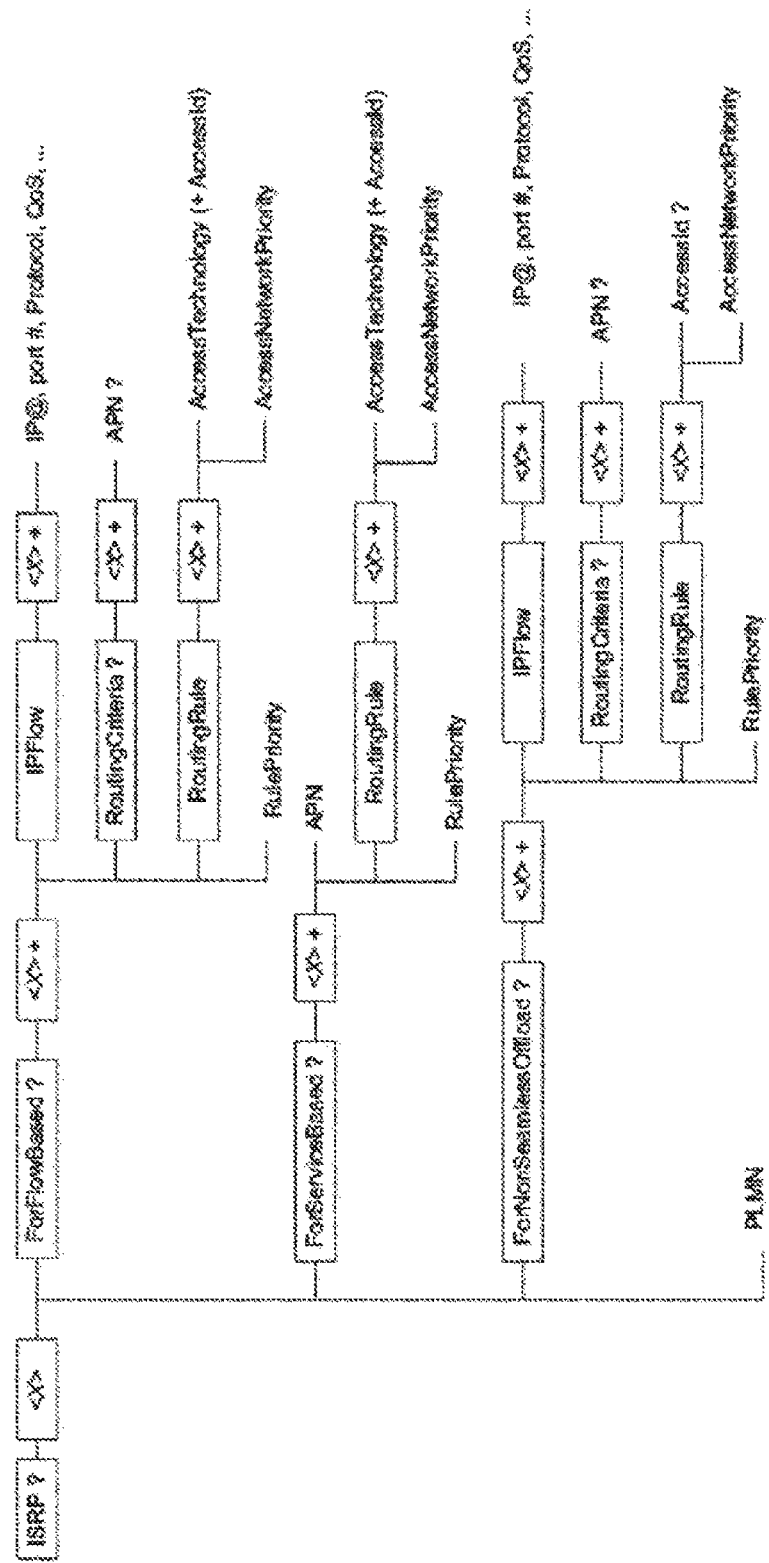
FIG. 10 depicts ISRP rules used to assist UE behavior for the IFOM, MAPCON and Non-seamless WLAN offload (NSWO) features.

FIG. 10 depicts ISRP rules used to assist UE behavior for the IFOM, MAPCON and NSWO features. The present description proposes to enhance ISRP of FIG. 10 by adding a newly-defined flow distribution container, i.e., ForinterAPNRouting, which is the same level as the three flow distribution containers (i.e., ForFlowBased, ForService-Based, and ForNonSeamlessOffload).

Referring to FIG. 10, one simplified example of ISRP rules consists of at least one 'flow distribution container', i.e., ForFlowBased flow distribution container (for IFOM), 'ForServiceBased' flow distribution container (for MAPCON), and 'ForNonSeamlessOffload' (for NSWO) flow distribution container. Further, as depicted in FIG. 10, each 'flow distribution container' consists of at least one flow distribution rule. Each 'flow distribution rule' includes:

Candidate traffic identifier ('IPFlow' description for IFOM and NSWO, 'APN' for MAPCON), RoutingRule consisting of target access network ('AccessTechnology'+'AccessID' for IFOM and MAPCON, 'AccessID' only for NSWO) with associated 'AccessNetworkPriority', Rule Priority, and/or For IFOM and NSWO there is an optional 'RoutingCriteria' field indicating APNs for which a particular flow distribution rule is valid.

In another aspect, the present description proposes to improve the logic of ISRP rule analysis by allowing the UE to make a second round (or additional iteration) through the ISRP rules. In particular, if the UE selects a flow distribution rule from the newly-added 'ForInterAPNRouting' container in the first round, and if the UE is IFOM- and/or MAPCON-capable (or a preferred APN based on 'ForInterAPNRouting' is IFOM- and/or MAPCON-capable), it needs to go through a second round. The rules from the 'ForInterAPNRouting' container and the 'ForNonSeamlessOffload' container (if present) are not active in the second round.

Figure 11:
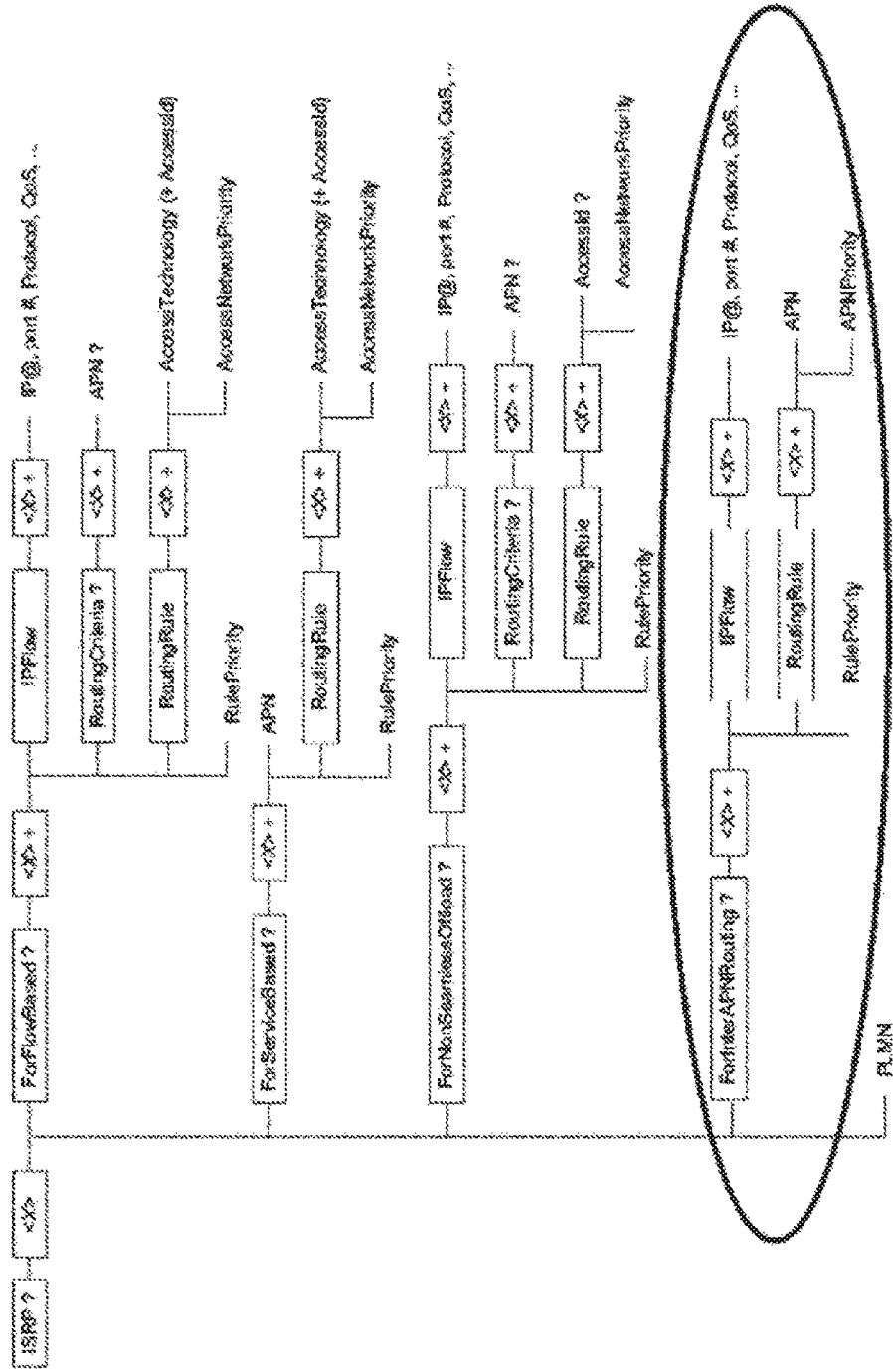
FIG. 11 depicts ISRP rules in which the 'ForInterAPN-Routing container' is added.

FIG. 11 depicts ISRP rules in which the 'ForInterAPNRouting' container is added. As depicted in FIG. 11, the 'ForInterAPNRouting' container includes 'IPFlow' description, which is similar or identical to that of IFOM or NSWO. Further, the 'ForInterAPNRouting' container includes 'RoutingRule' consisting of target APNs with associated 'APNPriority'. Further, it includes 'RulePriority'.

Figure 12:
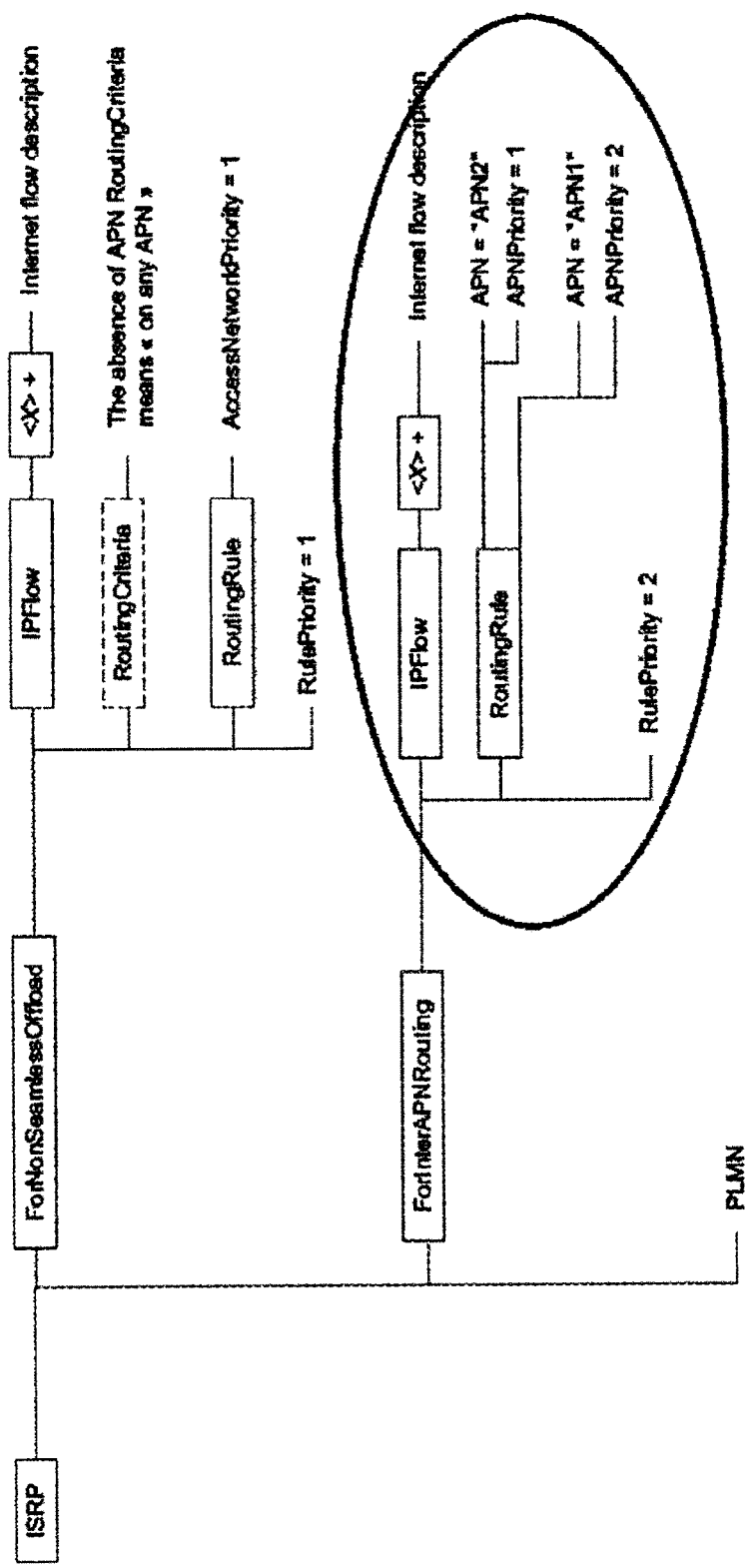
FIG. 12 depicts one example of ISRP rules which can solve a certain priority order.

As discussed above, the present description proposes a solution for a scenario of Interface Priority Order #1 (NSWO (highest), APN2, APN1 (lowest)). FIG. 12 depicts one example of ISRP rules which can solve Interface Priority Order #1 (NSWO (highest), APN2, APN1 (lowest)).

As depicted in FIG. 12, the 'ForInterAPNRouting' container has one flow distribution rule. In particular, the 'RoutingRule' depicted in FIG. 11 is a list of two APNs (i.e., APN2, APN1) with 'APN2' having higher APN priority than 'APN1'. Further, 'ForNonSeamlessOffload' container also has one flow distribution rule, i.e., the absence of 'AccessId' in the RoutingRule parameter (depicted in FIGS. 11-12) indicates on any WLAN. Thus, the absence of 'APN RoutingCriteria' indicates 'on any APN', as depicted in FIG. 12. Finally, the rule in the 'ForNonSeamlessOffload' container has higher priority. In particular, the overall priority order for the three interfaces is: NSWO (highest), APN2, APN1 (lowest).

Figure 13:
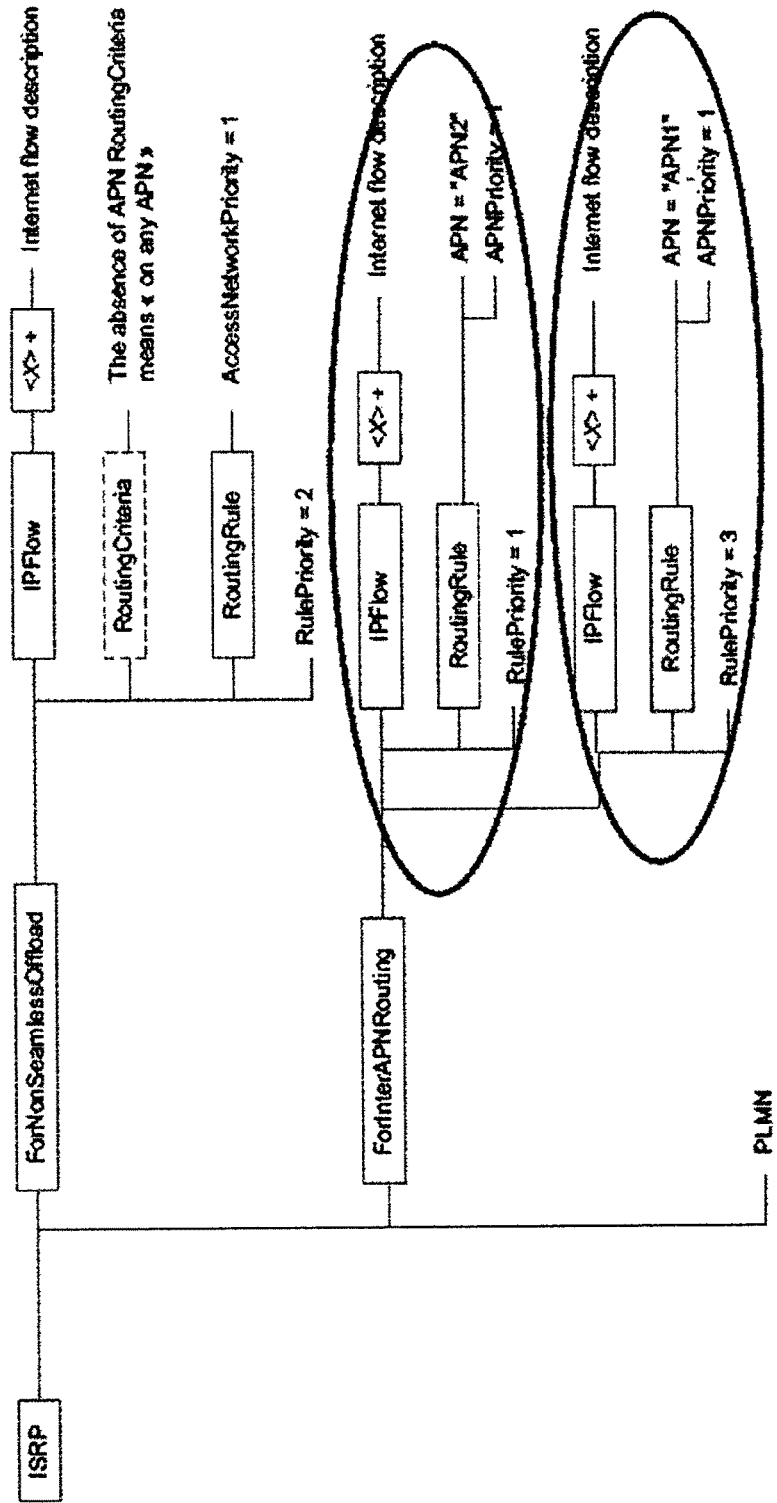
FIG. 13 depicts one example of ISRP rules which can solve a certain priority order.

As discussed above, the present description proposes a solution for a scenario of Interface Priority Order #2 (APN2 (highest), NSWO, APN1 (lowest)). FIG. 13 depicts one example of ISRP rules which can solve Interface Priority Order #2 (APN2 (highest), NSWO, APN1 (lowest)).

As depicted in FIG. 13, the 'ForInterAPNRouting' container has two flow distribution rules (one for APN 1 and the other for APN2). Namely, each 'RoutingRule' contains a single APN (i.e., APN2 or APN1). The flow distribution rule with APN2 in the 'RoutingRule' has higher 'RulePriority' than the flow distribution rule with APN1 in the 'RoutingRule'. Further, as depicted, the rule in the 'ForNonSeamlessOffload' container has 2nd highest priority ('RulePriority'=2). Accordingly, the overall priority order for the three interfaces is: APN2 (highest), NSWO, APN1 (lowest).

The present description further proposes a solution for a scenario, in which there is one PDN connection (or its associated APN) that is IFOM enabled and a possibility for performing NSWO in parallel, which is illustrated in FIG. 9. Although FIG. 14 is applicable to various scenarios, it depicts one example which can provide routing policies for a scenario of FIG. 9.

Figure 14:
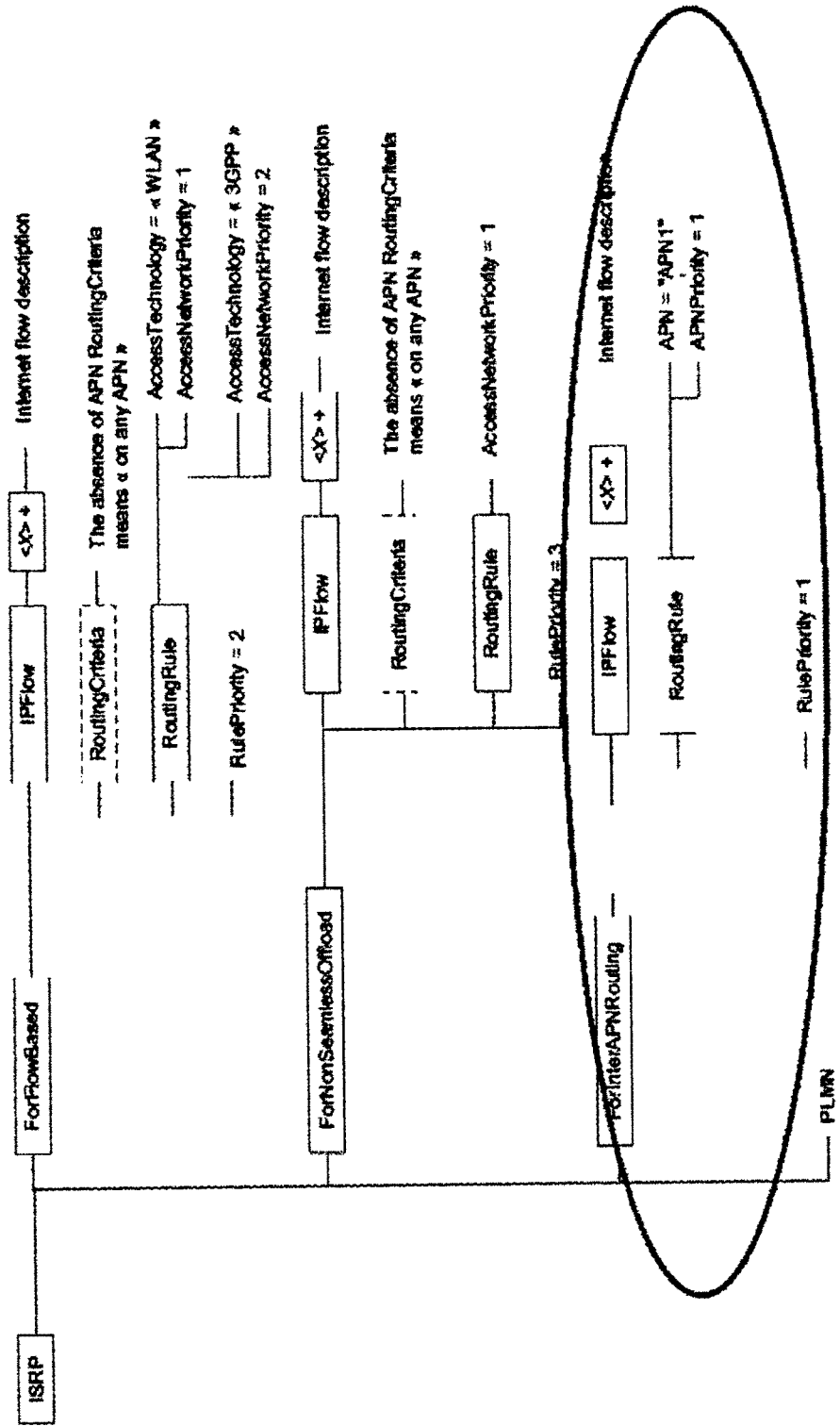
FIG. 14 depicts one example of ISRP rules which can solve a certain priority order.

In FIG. 14, the UE is able to perform the first round, and thereafter the second round in a certain condition. In particular, if the UE selects a flow distribution rule from the 'ForInterAPNRouting' container in the first round, and if it is IFOM- and/or MAPCON-capable, it needs to go through the second round. In this case, the rules from the 'ForInterAPNRouting' container and the 'ForNonSeamlessOffload container' (if present) may not be active in the second round.

For instance, in the first round the UE selects APN1, and thereafter in the second round the UE selects WLAN access for traffic routed via APN1, being steered by a Rel-10 rule from the 'ForFlowBased' container. The rules in the 'ForInterAPNRouting' and 'ForNonSeamlessOffload' containers are used only in the first round.

In conventional art, even in case where APN1 which is IFOM enabled and which has different access technologies (e.g., WLAN and 3GPP) is selected by the UE, there is no procedure to further determine or evaluate priorities of such different access technologies. However, the present description further proposes an additional round (or iteration) to evaluate.

As depicted, FIG. 14 is applicable to a case where it is assumed that the Interface Priority Order #3 (APN1 highest, NSWO lowest) and that one access (i.e., WLAN) is higher priority than the other access (i.e., 3GPP) within APN1. It should be noted that FIG. 14 is also applicable to interactions with MAPCON, instead of IPOM.

Examples of FIGS. 10-14 have advantageous aspects as follows:
  Enhance the Rel-10 ISRP rule by defining a new flow distribution container ('ForInterAPNRouting') comprising rules for inter-APN routing.
  Allow the UE to make a second round through the ISRP rules: if the UE selects a flow distribution rule from the 'ForInterAPNRouting' container in the first round, and if it is IFOM- and/or MAPCON-capable, it needs to go through a second round; the rules from the 'ForInterAPNRouting' container and the 'ForNonSeamlessOffload' container (if present) are not active in the second round.

It can be understood that the best case scenario would be to make a new "InterAPN+NSWO" rule, which would be considered first. Then, a "new" ISRP rule, in which only MAPCOM/IFOM is considered and with NSWO deleted, will be considered thereafter. However, it would not be desirable to simply delete the parameter related to NSWO, which was just newly introduced relatively recently into the ISRP rules.

The operator can define one or more ISRP rules per UE. For example, if the UE has 3 interfaces (e.g. APN1, APN2, NSWO), for a given time, each can be designated for APN1, APN2, or NSWO. Namely, these interfaces are changeable due to communication conditions, to save battery power, or for other reasons. As such, as Example #1, the interfaces can be considered in the following order: APN2 NSWO APN1. As Example #2, the interfaces can also be considered in a different order: NSWO APN2 APN1.

In contrast, the "worst case" scenario would be to keep the Rel-10 ISRP rules and the Inter-APN rules unrelated to each other. Namely, such rules could be independently considered.

Thus, the present invention has been conceived to be a compromise between best case and worst case scenarios.

Figure 15:
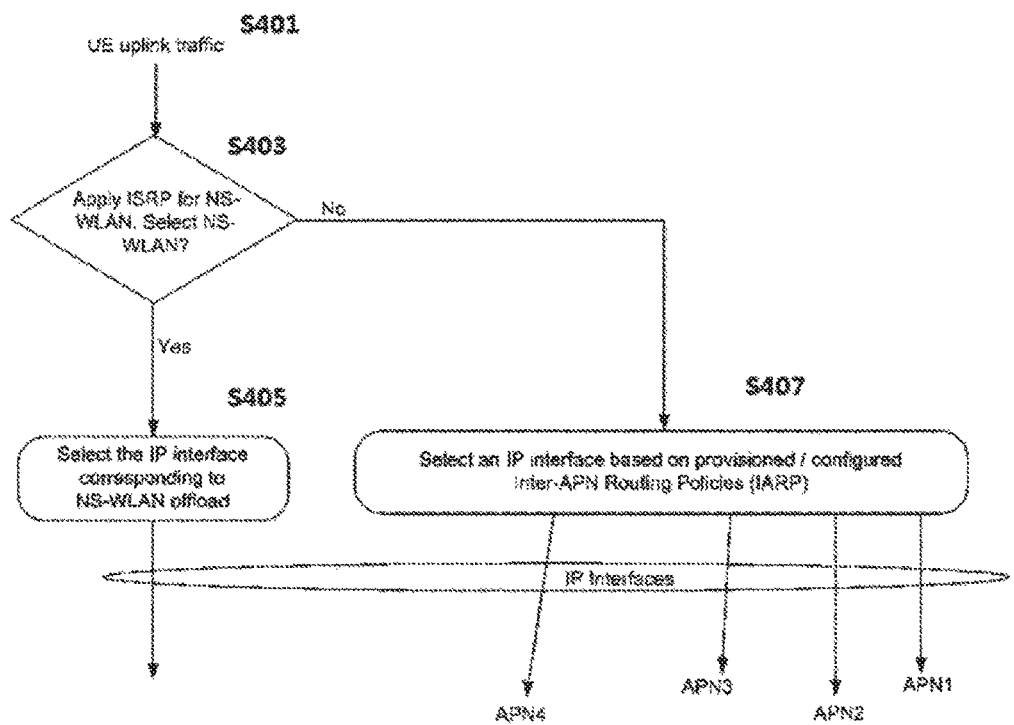
FIG. 15 shows the scope of IARP applicability and how IARP policies can be applied in conjunction with ISRP for NS-WLAN offload policies.

FIG. 15 shows the scope of IARP applicability and how IARP policies can be applied in conjunction with ISRP for NS-WLAN offload policies.

Upon receiving UE uplink traffic (S401), the ISRP for NS-WLAN is applied (S403). If the NS-WLAN is selected, then the IP interface corresponding to the NS-WLAN offload is selected (S405). If the NS-WLAN is not selected, an IP interface based on provisioned or configured Inter-APN Routing Policies (TARP) is selected (S407).

It should be noted that FIG. 15 aims at showing only the relationship between the ISRP for NSWLAN and the Inter-APN routing policies. For routing uplink traffic the UE may take into account other parameters (e.g. the local operating environment information) which are not shown in FIG. 4 for simplicity.

Here, FIG. 15 assumes that the policies for non-seamless WLAN offload (NSWO) are evaluated by the UE before the evaluation of Inter-APN Routing Policies. It is FFS if this order of policy evaluation is necessary or if any possible order could be supported. Also, it is FFS if this solution can enable scenarios where WLAN is not the default interface.

The Inter-APN Routing Policies (IARP) can be statically configured in the UE or they could be provisioned by the ANDSF. A UE that is inter-APN capable can use IARP to select an outgoing interface based on the preferred APN in IARP policies. A UE is defined to be inter-APN capable if it is capable of routing IP flows across multiple simultaneously active interfaces, each one associated with a different APN. These interfaces may be linked to different access networks or linked with the same access network.

The following assumptions and specifications apply:
  Every IP interface that can be selected with IARP is associated with a different APN.
  IP interfaces not associated with an APN are considered outside the scope of IARP. Such interfaces could include e.g. an IP interface to a tethering device connected to UE over USB, or an IP interface corresponding to an enterprise VPN connection over WLAN, etc.
  The scenario where multiple IP interfaces are associated with the same APN is also considered outside the scope of IARP.
  The ANDSF may provide a list of inter-APN Routing Policies to UE. A UE that is inter-APN routing capable uses these policies to select an existing IP interface to route IP flows that match specific criteria (e.g. all flows to a specific TCP port or to a specific destination address, etc).
  Each inter-APN routing policy includes the following information:
  Validity conditions, i.e. conditions indicating when the provided policy is valid.
  One or more Filter Rules, each one identifying a prioritised list of APNs which should be used by the UE to route IP flows that match specific IP filters. A filter rule also identifies which APNs are restricted for IP flows that match specific IP filters.
  An Inter-APN routing capable UE selects an existing IP interface, which is associated with a specific APN, to route IP flows based on the received/provisioned inter-APN routing policies and user preferences.
  Hereafter, the impact on existing nodes or functionality will be examined.

The relationship between IARP and ISRP policies (excluding MAPCON policies for simplicity) is schematically shown in FIG. 15.

Other considerations related to scenarios where multiple PDN connections carry traffic with overlapping private IPv4 addresses, DIDA, and the like may be needed.

Meanwhile, the potential implications of the co-existence of OPIIS and IETF mechanisms can be considered. Some examples of IETF mechanisms that may have to be considered for the co-existence with OPIIS may be: RFC3442 The Classless Static Route Option for Dynamic Host Configuration Protocol (DHCP) version 4, RFC4191 Default Router Preferences and More-Specific Routes, draft-ietf-mif-dhcpv6-route-option, DHCPv6 Route Option, draft-ietf-mif-dns-server-selection, Improved DNS Server Selection for Multi-Homed Nodes, draft-ietf-6man-addr-select-opt, and Distributing Address Selection Policy using DHCPv6.

Meanwhile, another following example of the potential need for co-existence implications is based on IPv6 and on the split UE scenario, where the TE is represented by a laptop or any other off-the-shelf wireless device other than a 3GPP Mobile phone. In general the co-existence may be relevant not only to the split UE scenario but also to the scenario with a monolithic UE.

This example illustrates a case where a TE is connected to the Internet directly via local access, such as WLAN (i.e., non-seamless offloading), and via a cellular network as provided by a MT. In this scenario, ANDSF may be used to configure the MT, but not the TE. On the other hand, the PGW could utilize IETF mechanisms to "configure" TEs routing table to influence its routing decisions.

Figure 16:
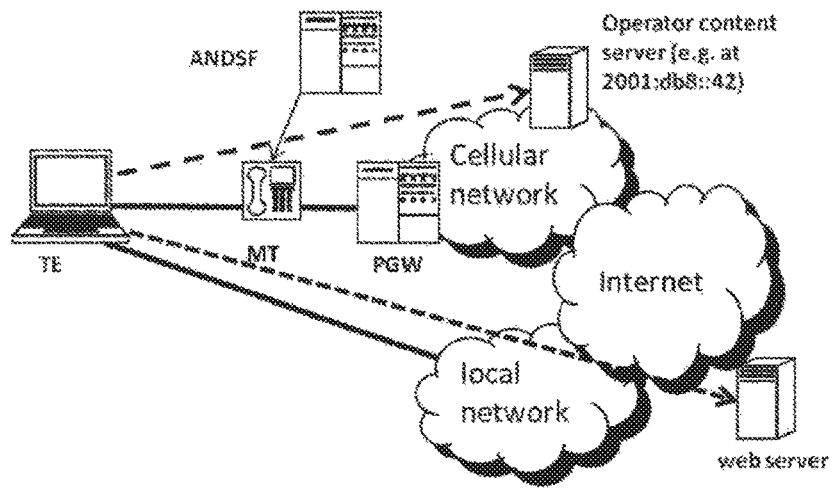
FIG. 16 depicts a split UE scenario using IETF mechanisms to configure the TE (Terminal Equipment).

FIG. 16 depicts a split UE scenario using IETF mechanisms to configure the TE (Terminal Equipment). It should be noted that the co-existence case with IETF mechanisms described above also applies to Rel-10 inter-system routing policies for non-seamless WLAN offload. Also, the example considered above focuses mainly on IPv6, but similar considerations can be applicable to IPv4.

It can be said that the present invention provides a method comprising: receiving, by a UE from a server, an Inter-System Routing Policy (ISRP) rule that comprises flow distribution rules for at least one of a For Flow Based flow distribution container used for IP Flow Mobility (IFOM), a For Service Based flow distribution container used for Multi-Access PDN Connectivity (MAPCON), a For Non-Seamless Offload flow distribution container used for Non-Seamless WLAN Offload (NSWO), and an Inter-APN routing flow distribution container, wherein the Inter-APN routing flow distribution container comprises information related to routing IP flows with respect to a plurality of APNs for using PDN connections to access multiple IP networks; and selecting, by the UE, among active/valid flow distribution rules in the received ISRP rule, a flow distribution rule having highest priority.

A flow distribution rule is active or valid depends upon at least one among UE location, network coverage, roaming situation, and time of day. The information in the Inter-APN routing flow distribution container includes an IP Flow description parameter, a Routing Rule parameter, and a Rule Priority parameter, said Routing Rule parameter comprising a list of APNs sorted by priority order, each APN identifying a PDN connection. The Rule Priority parameter for the Inter-APN routing flow distribution container is set in view of respective rule priorities for IFOM, for MAPCOM, and for NSWO. In other words, the rule priority parameter's scope extends across all four containers. The Rule Priority parameter for the Inter-APN routing flow distribution container is set upon excluding the flow distribution rules in the Inter-APN routing flow distribution container and the flow distribution rules in the NSWO flow distribution container.

Also, there is provided a method comprising: generating, by a server, an Inter-System Routing Policy (ISRP) rule comprising an Inter-APN routing flow distribution container and at least one of an IP Flow Mobility (IFOM) flow distribution container, a Multi-Access PDN Connectivity (MAPCON) flow distribution container, and a Non-Seamless WLAN Offload (NSWO) flow distribution container, wherein the defined Inter-APN routing flow distribution container comprises information related to routing IP flows with respect to a plurality of APNs for using PDN connections to access multiple IP networks; wherein the Inter-APN routing flow distribution container includes an IP Flow parameter, a Routing Rule parameter, and a Rule Priority parameter, said Routing Rule parameter comprises a list of APNs sorted by priority order, wherein the Rule Priority parameter for the Inter-APN routing flow distribution container is set in view of respective rule priorities for IFOM, for MAPCOM, and for NSWO; and providing, to a mobile terminal, the generated ISRP rule that includes the Inter-APN routing flow distribution container.

Additionally, there is provided a user equipment (UE) comprising: a receiving means to receive, from a server, an Inter-System Routing Policy (ISRP) rule that comprises flow distribution rules for at least one of a For Flow Based flow distribution container used for IP Flow Mobility (IFOM), a For Service Based flow distribution container used for Multi-Access PDN Connectivity (MAPCON), a For Non-Seamless Offload flow distribution container used for Non-Seamless WLAN Offload (NSWO), and an Inter-APN routing flow distribution container, wherein the Inter-APN routing flow distribution container comprises information related to routing IP flows with respect to a plurality of APNs for using PDN connections to access multiple IP networks; and a selecting means to select among active/valid flow distribution rules in the received ISRP rule, a flow distribution rule having highest priority.

In such method, a flow distribution rule is active or valid depends upon at least one among UE location, network coverage, roaming situation, and time of day. The information in the Inter-APN routing flow distribution container includes an IP Flow description parameter, a Routing Rule parameter, and a Rule Priority parameter, said Routing Rule parameter comprising a list of APNs sorted by priority order, each APN identifying a PDN connection. The Rule Priority parameter for the Inter-APN routing flow distribution container is set in view of respective rule priorities for IFOM, for MAPCOM, and for NSWO. In other words, the rule priority parameter's scope extends across all four containers. The Rule Priority parameter for the Inter-APN routing flow distribution container is set upon excluding the flow distribution rules in the Inter-APN routing flow distribution container and the flow distribution rules in the NSWO flow distribution container.

Additionally, provided is a server comprising: a generating means to generate an Inter-System Routing Policy (ISRP) rule comprising an Inter-APN routing flow distribution container and at least one of an IP Flow Mobility (IFOM) flow distribution container, a Multi-Access PDN Connectivity (MAPCON) flow distribution container, and a Non-Seamless WLAN Offload (NSWO) flow distribution container, wherein the defined Inter-APN routing flow distribution container comprises information related to routing IP flows with respect to a plurality of APNs for using PDN connections to access multiple IP networks; wherein the Inter-APN routing flow distribution container includes an IP Flow parameter, a Routing Rule parameter, and a Rule Priority parameter, said Routing Rule parameter comprises a list of APNs sorted by priority order, wherein the Rule Priority parameter for the Inter-APN routing flow distribution container is set in view of respective rule priorities for IFOM, for MAPCOM, and for NSWO; and a providing means to provide, to a mobile terminal, the generated ISRP rule that includes the Inter-APN routing flow distribution container.

INDUSTRIAL APPLICABILITY

The features and concepts herein are applicable to and can be implemented in various types of user devices (e.g., mobile terminals, handsets, wireless communication devices, etc.) and/or network devices, entities, components, etc. that can be configured to support multi-homed terminals.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

What is claimed is:

1. A method of routing IP flows in a wireless communication system, comprising:
   receiving, by a UE from a server, a multiple interface related routing policy rule that comprises:
   a first set of flow distribution rules and a second set of flow distribution rules,
   wherein the first set of distribution rules is equal in hierarchy within the multiple interface related routing policy rule to the second set of flow distribution rules,
   wherein the first set of flow distribution rules comprises:
      a first flow distribution rule for a For Flow Based flow distribution used for IP Flow Mobility (IFOM), the first flow distribution rule including an indicator indicating a priority of the first flow distribution rule,
      a second flow distribution rule for a For Service Based flow distribution used for Multi-Access Packet Data Network (Multi-Access PDN) Connectivity (MAPCON), the second flow distribution rule including an indicator indicating a priority of the second flow distribution rule, and
      a third flow distribution rule for a For Non-Seamless Offload flow distribution used for Non-Seamless WLAN Offload (NSWO), the third flow distribution rule including an indicator indicating a priority of the third flow distribution rule, and
   wherein the second set of flow distribution rules comprises a fourth flow distribution rule for an Inter-Access Point name (Inter-APN) routing flow distribution comprising information on at least one prioritized APN, the fourth flow distribution rule including an indicator indicating a priority of the fourth flow distribution rule;
   performing, by the UE, a first round of rule evaluation to select a flow distribution rule from the first set of flow distribution rules and the second set of flow distribution rules; and
   when the selected flow distribution rule is from the fourth flow distribution rule, then performing, by the UE, a second round of rule evaluation, wherein the second round of rule evaluation is performed if the UE supports the IFOM or the MAPCON.

2. The method of claim 1, wherein the flow distribution rule in the second set of flow distribution rules is active or valid depends upon at least one among UE location, network coverage, roaming situation, and time of day.

3. The method of claim 1, further comprising:
   routing an IP flow by the UE based on the flow distribution rule selected from the first set of flow distribution rules and the second set of flow distribution rules.

4. A user equipment (UE) in a wireless communication system, comprising:
   a receiver; and
   a processor configured to
      receive, from a server, a multiple interface related routing policy rule that comprises:
      a first set of flow distribution rules and a second set of flow distribution rules,
      wherein the first set of distribution rules is equal in hierarchy within the multiple interface related routing policy rule to the second set of flow distribution rules,
      wherein the first set of flow distribution rules comprises:
         a first flow distribution rule a For Flow Based flow distribution used for IP Flow Mobility (IFOM), the first flow distribution rule including an indicator indicating a priority of the first flow distribution rule,
         a second flow distribution rule for a For Service Based flow distribution used for Multi-Access Packet Data Network (Multi-Access PDN) Connectivity (MAPCON), the second flow distribution rule including an indicator indicating a priority of the second flow distribution rule, and
         a third flow distribution rule for a For Non-Seamless Offload flow distribution used for Non-Seamless WLAN Offload (NSWO), the third flow distribution rule including an indicator indicating a priority of the third flow distribution rule, and
      wherein the second set of flow distribution rules comprises a fourth flow distribution rule for an Inter-Access Point name (Inter-APN) routing flow distribution comprising information on at least one prioritized APN, the fourth flow distribution rule including an indicator indicating a priority of the fourth flow distribution rule,
      perform a first round of rule evaluation to select a flow distribution rule from the first set of flow distribution rules and the second set of flow distribution rules; and
      when the selected flow distribution rule is from the fourth flow distribution rule, then perform a second round of rule evaluation, wherein the second round of rule evaluation is performed if the UE supports the IFOM or the MAPCON.

5. The user equipment of claim 4, wherein the flow distribution rule in the second set of flow distribution rules is active or valid depends upon at least one among UE location, network coverage, roaming situation, and time of day.

6. The user equipment of claim 4, wherein the processor is further configured to route an IP flow by the UE based on the flow distribution rule selected from the first set of flow distribution rules and the second set of flow distribution rules.

\* \* \* \* \*